US007589962B1

(12) United States Patent
Bhatia (10) Patent No.: US 7,589,962 B1
(45) Date of Patent: Sep. 15, 2009

(54) APPARATUS FOR COOLING A HEAT DISSIPATING DEVICE LOCATED WITHIN A PORTABLE COMPUTER (75) Inventor: Rakesh Bhatia, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 3139 days.

(21) Appl. No.: 08/902,371

(22) Filed: Jul. 29, 1997

(51) Int. Cl.
H05K 7/20 (2006.01)
(52) U.S. Cl. .................................. 361/679.47
(58) Field of Classification Search ........... 361/687, 361/689, 696, 700, 699, 701, 707, 703–705, 361/717–719; 62/3.3, 3.7, 259.2; 165/80.3, 165/80.4, 104.33, 185, 104.19, 104.21, 104.23, 165/104.26; 174/15.2, 16.3
See application file for complete search history.

(56) References Cited

U.S. PATENT DOCUMENTS

| 3,613,778 | A | * | 10/1971 | Feldman, Jr. et al. ... | 165/104.26 |
| 3,680,189 | A | * | 8/1972 | Noren ................... | 165/104.26 |
| 3,803,688 | A | * | 4/1974 | Peck ..................... | 165/104.26 |
| 5,283,715 | A | * | 2/1994 | Carlsten et al. ......... | 165/104.33 |
| 5,313,362 | A |   | 5/1994 | Hatada et al. ........... | 361/709 |
| 5,409,055 | A |   | 4/1995 | Tanaka et al. .......... | 165/104.33 |
| 5,513,070 | A | * | 4/1996 | Xie et al. .............. | 174/15.2 |
| 5,526,289 | A | * | 6/1996 | Dinh et al. ............. | 361/687 |
| 5,557,500 | A |   | 9/1996 | Baucom et al. .......... | 361/687 |
| 5,568,360 | A | * | 10/1996 | Penniman et al. ........ | 361/687 |
| 5,581,443 | A |   | 12/1996 | Nakamura et al. ........ | 361/705 |
| 5,588,483 | A |   | 12/1996 | Ishida .................. | 165/86 |
| 5,598,320 | A | * | 1/1997 | Toedtman et al. ........ | 361/687 |
| 5,621,613 | A |   | 4/1997 | Haley et al. ............ | 361/687 |
| 5,642,776 | A |   | 7/1997 | Meyer, IV et al. ....... | 165/104.26 |
| 5,646,822 | A | * | 7/1997 | Bhatia et al. ........... | 165/104.33 |
| 5,661,637 | A |   | 8/1997 | Villaume ............... | 361/687 |
| 5,694,294 | A | * | 12/1997 | Ohashi et al. ........... | 361/687 |
| 5,718,282 | A | * | 2/1998 | Bhatia et al. ........... | 165/104.33 |
| 5,764,482 | A | * | 6/1998 | Meyer, IV et al. ........ | 361/699 |
| 5,831,333 | A | * | 11/1998 | Malladi et al. .......... | 361/719 |
| 5,880,929 | A |   | 3/1999 | Bhatia .................. | 361/687 |

FOREIGN PATENT DOCUMENTS

| CN | 307395 | 10/1995 |
| EP | 0702287 A2 | 3/1996 |
| WO | WO 98/50847 | 11/1998 |

OTHER PUBLICATIONS

International Search Report of PCT application No. PCT/US98/02054, Feb. 4, 1998, 4 pages.

* cited by examiner

Primary Examiner—Leo P. Picard
Assistant Examiner—Lisa Lea-Edmonds
(74) Attorney, Agent, or Firm—Blakely, Sokoloff, Taylor & Zafman LLP (57) ABSTRACT An apparatus for cooling a heat generating component located within a portable computer system enclosure. In one embodiment a flat heat pipe is attached to the bottom surface of the portable computer keyboard support plate. The flat heat pipe is thermally coupled to one or more heat generating components housed within the computer system enclosure.

28 Claims, 14 Drawing Sheets

FIG. 12B

APPARATUS FOR COOLING A HEAT DISSIPATING DEVICE LOCATED WITHIN A PORTABLE COMPUTER

FIELD OF THE INVENTION

The present invention relates to an apparatus for cooling heat dissipating components within electronic and computer system enclosures.

BACKGROUND OF THE INVENTION

Integrated circuits (ICs) are typically housed within a plastic or ceramic package. The packages have leads or surface pads that are soldered to a printed circuit board. The circuit board and package are often located within an enclosed computer chassis that contains other circuitry associated with the computer system such as peripherals, memory cards, video cards, power supplies, etc.

It is desirable to have a high rate of heat transfer from the IC package in order to maintain the temperatures of the IC within safe operating limits. Modern microprocessors typically employ millions of transistors in internal circuitry that require some type of cooling mechanism, otherwise, excessive temperatures may affect the performance of the circuit and cause permanent degradation of the device. Hence, as the performance of integrated circuits continue to expand, the need to provide more efficient, reliable and cost effective heat removal methods has become increasingly important in the design of computer system enclosures and particularly in small general purpose computer systems, such as laptop and notebook computers.

A number of prior art methods have been used to remove heat from heat generating components located within the confines of a computer system enclosure. For example, the method of cooling integrated circuit devices within notebook computers has evolved from the simple attachment of a finned heat sink to the top surface of the device, to the development of finned heat sinks having integral fans. More recent developments have included the use of large, flat heat spreading plates. In such applications, the integrated circuit (generally, the CPU) is directly or indirectly attached to a metal plate having a large heat spreading surface area.

Figure 1:
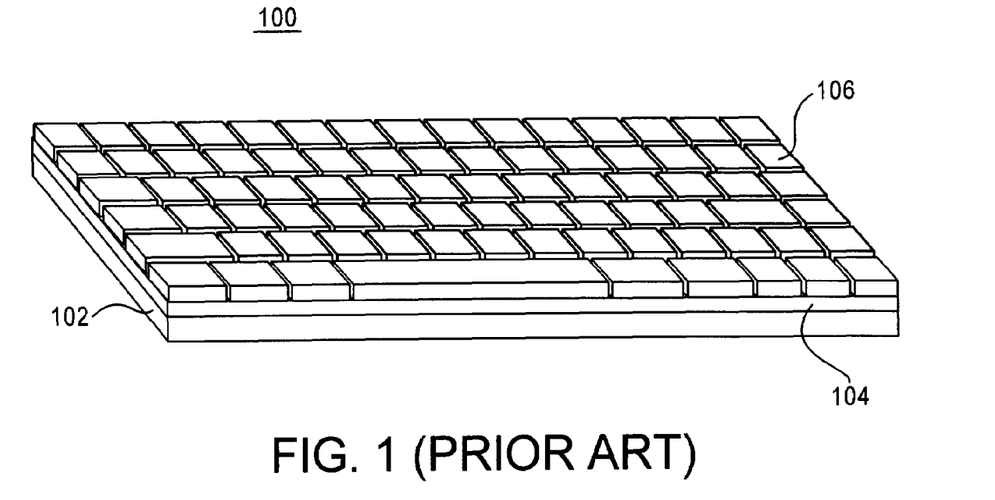
FIG. 1 illustrates a perspective view of a prior art computer keyboard.

Some prior art heat removal systems utilize the computer keyboard as the system heatsink structure. As shown in FIG. 1, a typical computer keyboard 100 includes a support plate 102 onto which is mounted a printed circuit board 104 and a plurality of keys 106 upon which a user may strike to input data into the computer. Generally, the keyboard support plate 102 is configured as one of the largest metallic members within a portable computer and is therefore chosen as a heatsink in some heat removal system designs.

Figure 2:
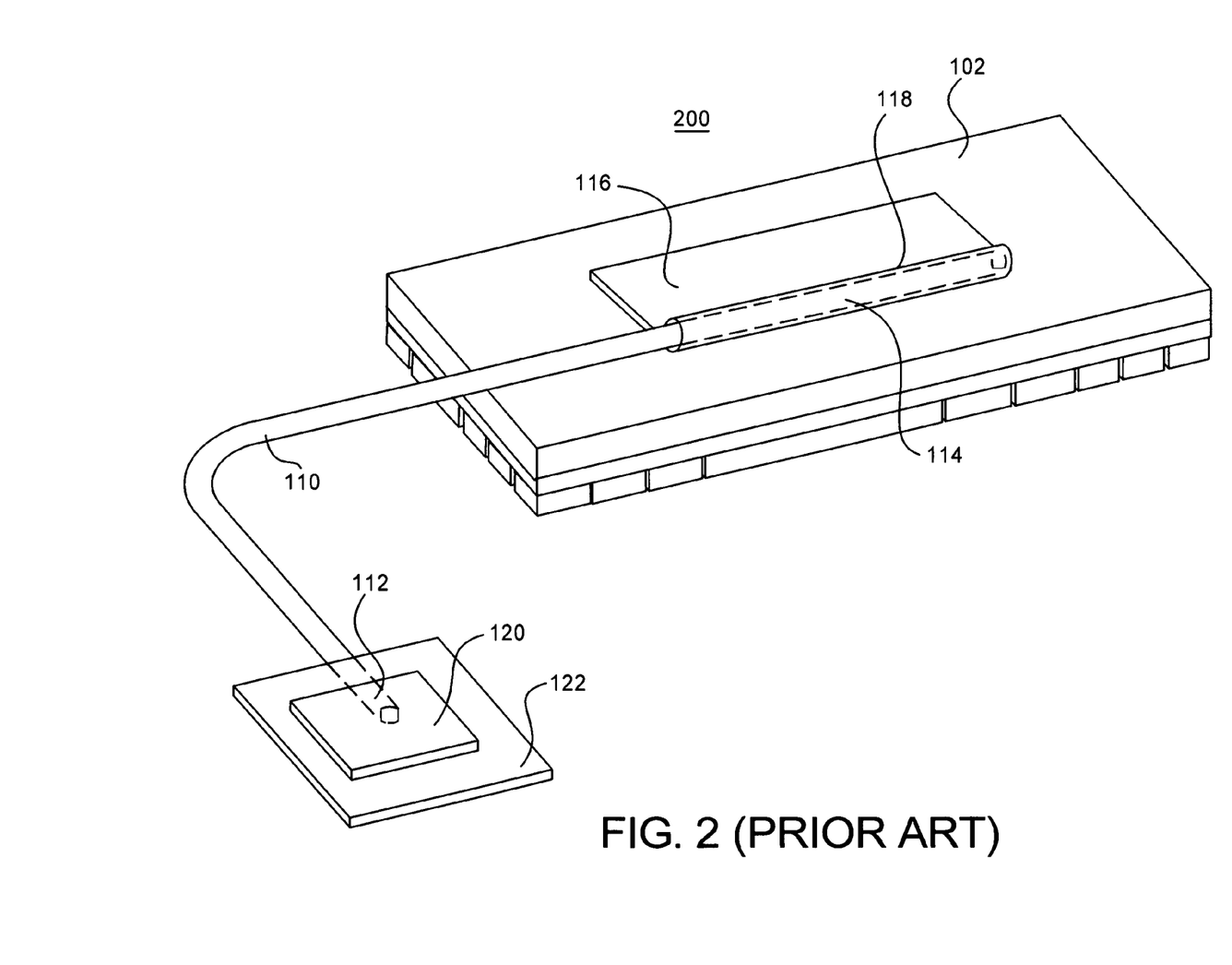
FIG. 2 illustrates a prior art heat removal system.

FIG. 2 illustrates a prior art heat removal system 200 located within a portable computer. Heat removal system 200 includes a circular heat pipe 110 that transfers heat away from an integrated circuit device 120 to a heat spreading plate 116 that is attached to the keyboard support plate 102. Device 120 is generally attached directly to a copper or aluminum mounting plate 122 by a thermal adhesive. Heat pipe 110 includes an evaporator portion 112 and a condenser portion 114. Evaporator portion 112 is typically embedded in mounting plate 122. Keyboard support plate 102 includes a clamp portion 118 for receiving the condenser portion 114 of heat pipe 110. Heat spreading plate 116 is generally a thin metal plate, such as aluminum.

U.S. Pat. No. 5,568,360 also describes a heat removal system for a portable computer wherein the keyboard support plate serves as the system heat sink.

A common problem associated with these prior art heat removal system is that the heat pipes are attached to a metal heat spreader plate along discrete locations. As a result, the temperature distribution across the surface of the heat spreader plate and keyboard tends to be non-uniform. The thin profile of the heat spreader plate also inhibits a uniform distribution of temperature across the keyboard. These result in the keyboard being substantially warmer in locations adjacent to the heat pipe and cooler at points located away from the heat pipe. This reduces the efficiency of the heat removal system. Moreover, the existence of hot spots along the surface of the keyboard can cause discomfort to the user.

What is needed then is an apparatus and method which solves the aforementioned problems associated with cooling internal electronic circuits located within portable consumer electronic and computer devices. Particularly, what is needed is a highly efficient cooling system that is conformable to the size restrictions imposed by small form factor and thin profile electronic devices, such as, for example, notebook computers.

SUMMARY OF THE INVENTION

An apparatus for removing heat from a heat generating component located within a portable computer system enclosure is disclosed. In accordance with the present invention a flat heat pipe is attached to the bottom surface of a portable computer keyboard support plate. The flat heat pipe is thermally coupled to one or more heat generating components housed within the computer system enclosure.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

An apparatus for removing heat from a heat generating component located within a portable computer system enclosure is disclosed. In the following description, numerous specific details are set forth such as material types, processing steps, etc., in order to provide a thorough understanding of the present invention. However, it will be obvious to one of skill in the art that the invention may be practiced without these specific details. In other instances, well known elements and processing techniques have not been shown in particular detail in order to avoid unnecessarily obscuring the present invention. In order to illustrate the need for cooling systems that are capable of being integrated within an enclosure having limited available space, this discussion will mainly be limited to those needs associated with removing heat from integrated circuits housed within portable computers, such as notebook and laptop computers. It will be recognized, however, that such focus is for descriptive purposes only and that the apparatus and methods of the present invention are applicable to other electronic devices.

Figure 3:
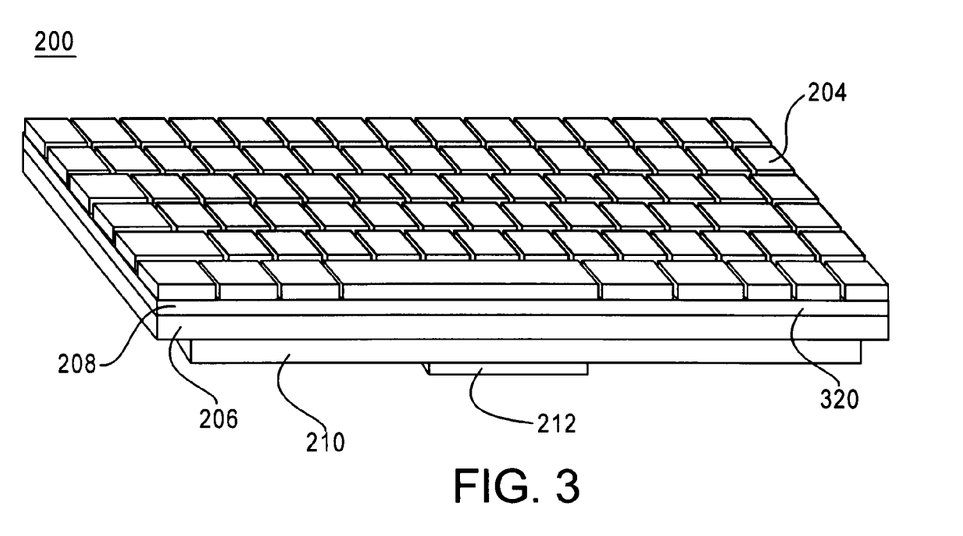
FIG. 3 is a perspective view of a flat heat pipe attached to a keyboard in accordance with one embodiment of the present invention.

FIG. 3 illustrates a heat removal apparatus 200 in one embodiment of the present invention. The heat removal apparatus includes a flat heat pipe 210 that is attached to the metal support plate 206 of a portable computer keyboard 204. Keyboard 204 includes a key pad that is mechanically coupled to a printed circuit board 208. Support plate 206 is generally made of a substantially rigid metal, such as aluminum or steel. The thickness of support plate 206 is typically 0.5 to 1.5 millimeters. In accordance with the present invention, a heat generating device 212 located within a portable computer is thermally coupled to flat heat pipe 210. Flat heat pipe 210 acts to distribute the heat generated by the device in a substantially uniform fashion across the surface of the keyboard support plate 206. In one embodiment of the invention, heat generated by device 212 is ultimately released from the keypad surface to the ambient environment by natural convection and radiation. The thickness of heat pipe 210 is typically 0.5 to 1.5 millimeters.

As previously noted, traditional heat removal systems have used thin metal heat spreader plates to distribute heat across the surface of the keyboard support plate. Although the use of a thin metal plate has provided sufficient heat spreading capability in the past, the large thermal resistance across the thin cross section of the metal plate inhibits a substantially uniform distribution of heat that is needed for the higher heat generating components of today. The present invention addresses this problem by providing a flat heat pipe 210 along the bottom surface of the keyboard support plate 206. As a result of the flat heat pipe's negligible thermal resistance, heat is more uniformly distributed across the surface of the keyboard support plate 206, thereby increasing the overall thermal efficiency and heat removal capability of the system.

Figure 4A:
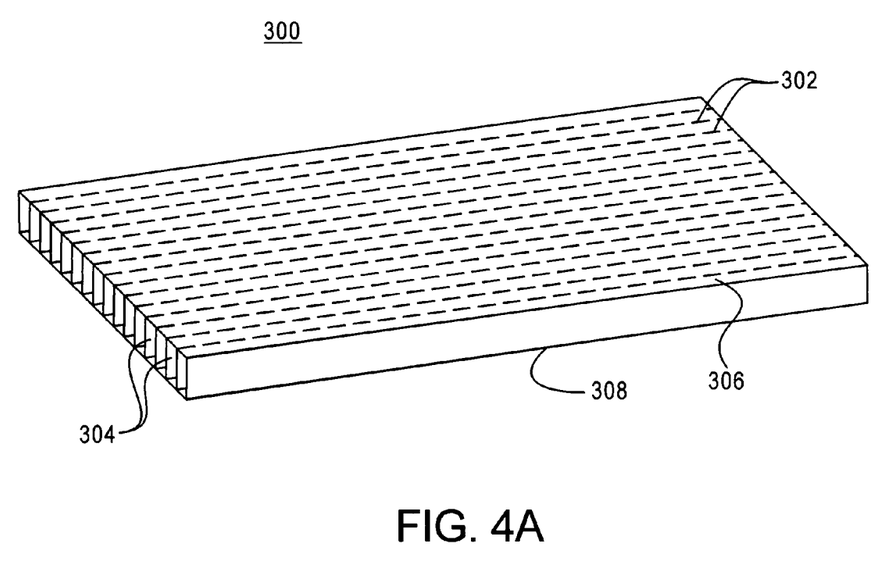
FIG. 4A is a perspective view of a flat heat pipe in accordance with one embodiment of the present invention.

FIG. 4A illustrates a perspective view of a flat heat pipe 300 that is used in one embodiment of the present invention. Heat pipe 300 comprise a top side surface 306, a back side surface 308 and a plurality of micro-channels 302 that are arranged in a parallel configuration. Each of the channels 302 is divided by sidewalls 304 and is sealed to contain a two-phase vaporizable liquid (not shown) which serves as the working fluid for the heat pipe. Each heat pipe draws vaporized fluid away from a heat input point (the evaporator region of the heat pipe) to a condenser region of the heat pipe. Each of heat pipes 302 contains a wick structure (not shown). The wick, by means of capillary flow, transports the condensed liquid from the condenser region back into the evaporator region of the heat pipe. The wick structure may include a wire mesh or grooves along the heat pipe walls, or any other porous member. Heat pipe 300 generally comprises a thermally conductive and rigid material, such as aluminum or copper. The rigidity of the heat pipe also helps minimize keyboard warpage resulting from user pressure against the keyboard keys.

Figure 4B:
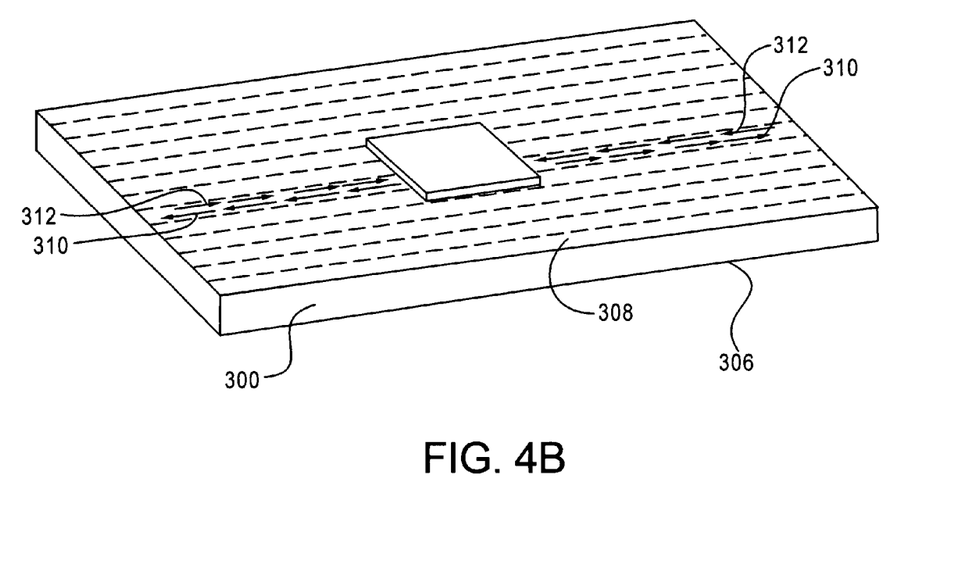
FIG. 4B shows the heat pipe of FIG. 4A having a heat generating device thermally coupled to the backside surface of the heat pipe.

Turning now to FIG. 4B, a heat generating device 330, such as a CPU (central processing unit), is shown attached to the backside surface 308 of heat pipe 300. Arrows 310 and 312 illustrate the working fluid flow pattern in one of micro-channels 302. The portion of the heat pipe residing near device 300 constitutes the evaporator region of the heat pipe. The condenser region resides near the outer side edges of heat pipe 300. Heat vaporizes the working fluid within the evaporator region of the heat pipe and creates a differential pressure between the evaporator region and condenser region. The pressure differential causes the vaporized fluid to be pumped from the evaporator region to the condenser region of the heat pipe. The capillary action of the heat pipe wick causes the condensed working fluid to flow from the condenser region back to the evaporator region.

In one embodiment, heat pipe 300 is made of aluminum. In such an embodiment, a Freon or Freon substitute is used as the heat pipe working medium. Heat pipe 300 may be made of other high thermally conductive materials, such as copper. When heat pipe 300 is made of copper a purified water is generally chosen as the heat pipe working fluid since it is chemically compatible with copper and possesses a high latent heat. The surface area of heat pipe 300 may vary considerably from one design to another. Preferably, the heat pipe surface area is maintained essentially the same as the key pad surface area. In this manner, the key pad surface temperatures will remain substantially isothermal. Among other advantages, this eliminates the existence of hot spots along the surface of the keyboard making it more comfortable for the user. It is important to note, however, that the keyboard heat pipe of the present invention is not limited to any specific shape or size. In other embodiments, the surface area of the flat heat pipe may be substantially smaller than the key pad surface area and may comprise a variety of other shapes such as circular, polygon, etc.

Figure 5:
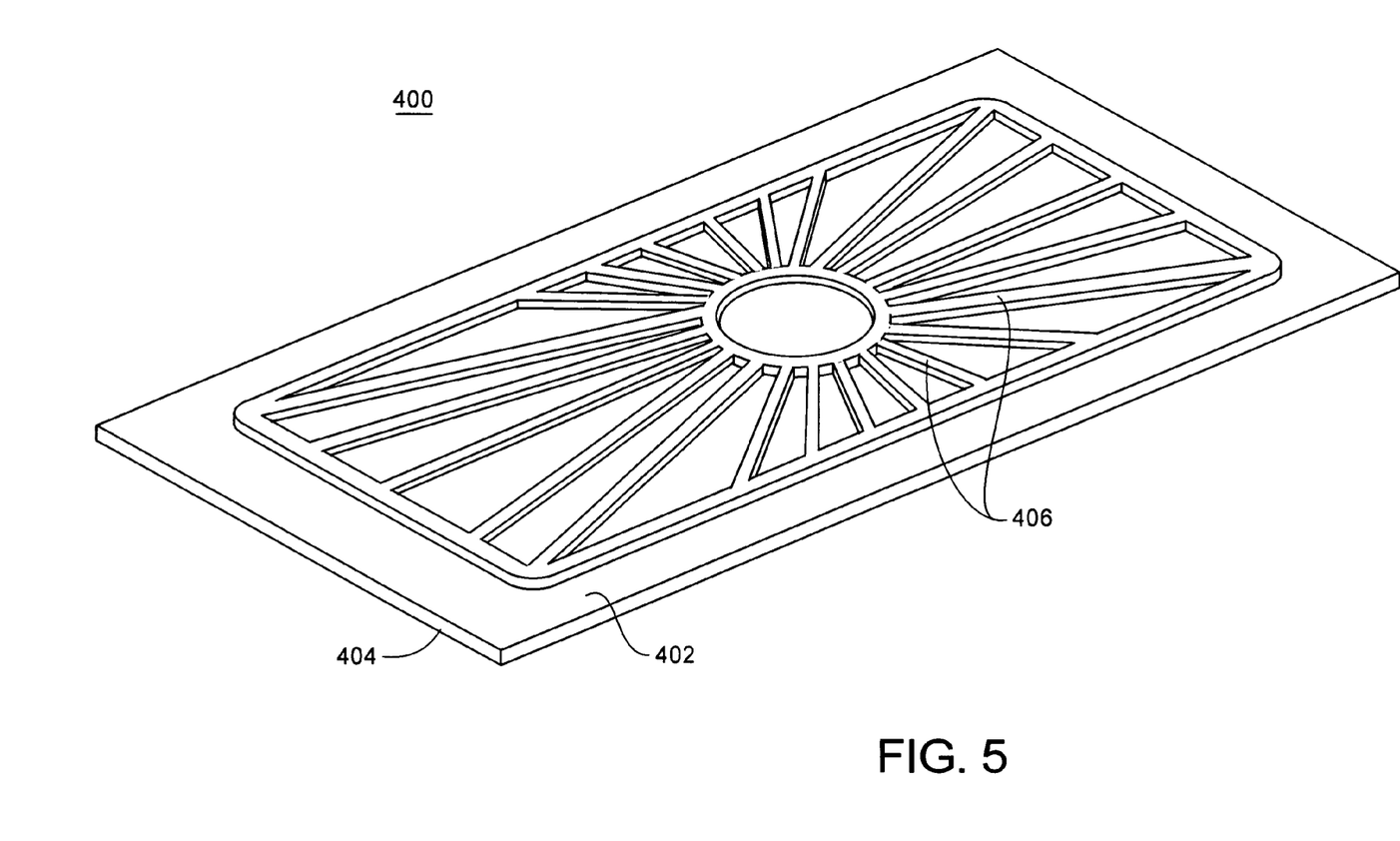
FIG. 5 is a perspective view of a flat heat pipe in another embodiment of the present invention.

The internal structure of the keyboard heat pipe of the present invention may vary considerably from one design to another. Thus, it is to be understood that the present inventor is not limited to any one heat pipe configuration. As an example, FIG. 5 illustrates a keyboard heat pipe 400 in accordance with another embodiment of the present invention. Heat pipe 400 comprises two thin metal plates, 402 and 404, that are joined by a roll pressing process. Heat pipe 400 is made by first stamping, milling, or otherwise forming one or more heat pipe channels 406 within one, or both, of plates 402 and 404. The heat pipe wicking structure may comprise grooves within the heat pipe channels that are formed during the stamping or milling process. Alternatively, a metal mesh or other porous member may be attached to the channel walls. Once plates 402 and 404 have been joined and sealed, channels 406 are evacuated and then charged with a working fluid.

Figure 6:
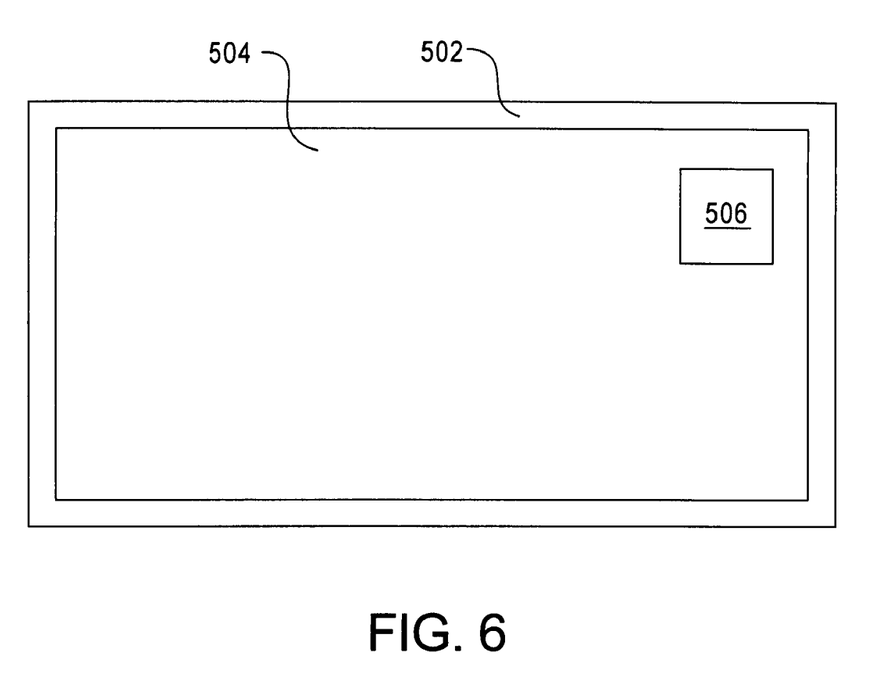
FIG. 6 is a bottom of view of a keyboard having a flat heat pipe attached to the backside of the keyboard support plate in one embodiment of the present invention.

In FIG. 6 a bottom view of a keyboard support plate 502 containing a flat heat pipe 504 is shown. As illustrated, heat pipe 504 covers a significant portion of keyboard support plate 502. An integrated circuit device 506, or any other heat generating device, may be thermally coupled, either directly or indirectly, to heat pipe 504. Since the effective thermal conductivity of heat pipe 504 is very high, there is essentially no limit as to the placement of device 506 on the bottom surface of the heat pipe.

Figure 7:
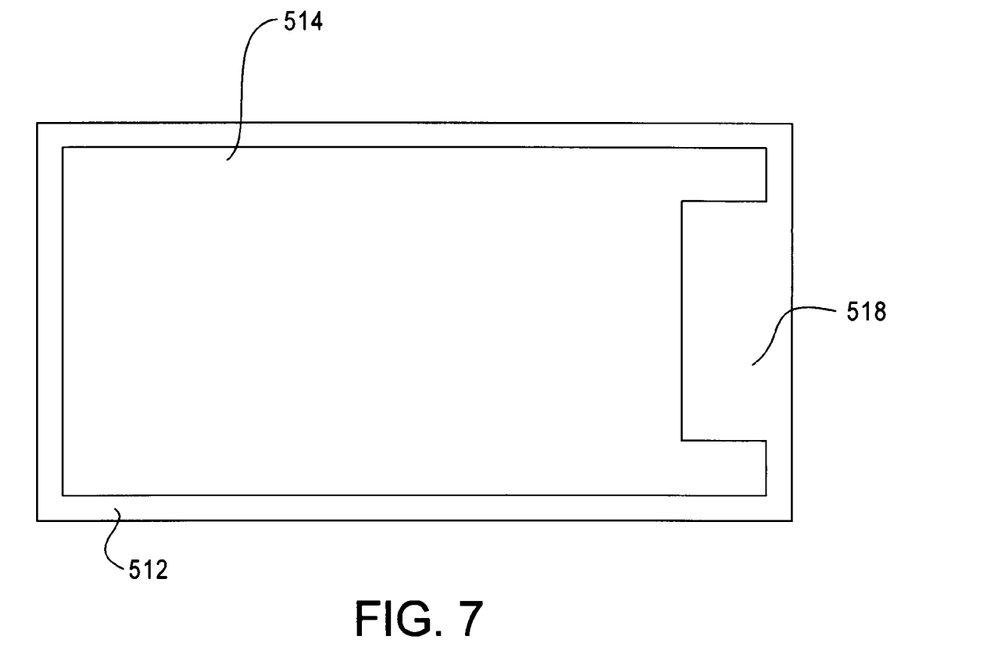
FIG. 7 is a bottom of view of a keyboard having a flat heat pipe attached to the backside of the keyboard support plate in another embodiment of the present invention.

Turning now to FIG. 7, a bottom view of a keyboard support plate 512 having a flat heat pipe 514 attached thereto is shown. An advantage of the present invention is that the shape of the flat heat pipe may be augmented in order to accommodate the placement of other components within the housing of a portable computer without greatly affecting the overall heat spreading ability of the apparatus. For example, as shown in FIG. 7, the shape of heat pipe 514 includes an open area 518 at one end. In one embodiment, the open area 518 is sized to accommodate the placement of a hard disk drive within a computer housing. It is appreciated that the size, shape, location and number of open areas will vary depending upon the particular space and heat removal requirements of the computer assembly.

Figure 8:
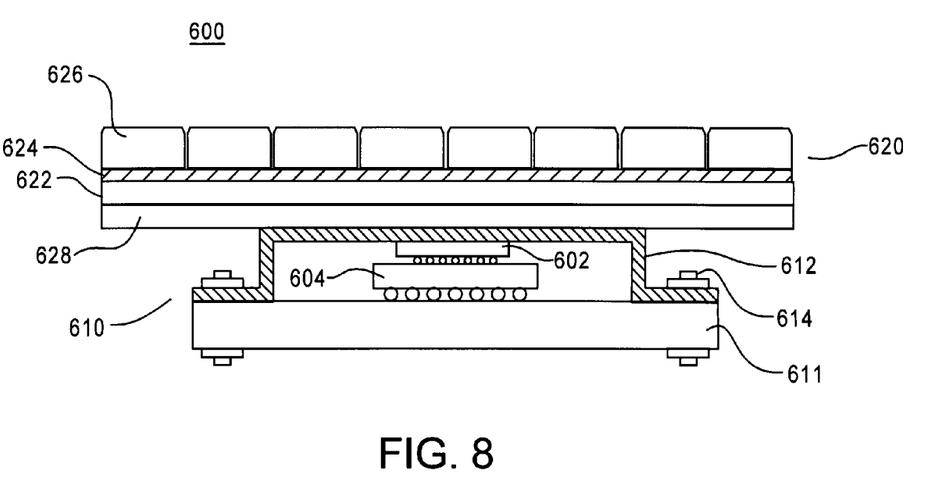
FIG. 8 illustrates a side-view of a heat removal system in accordance with one embodiment of the present invention.

With reference to FIG. 8, an apparatus 600 for transferring heat from an integrated circuit device 602 to the backside of a keyboard 620 is shown. Keyboard 620 comprises a keypad 626 and a printed circuit board 624 that are attached to a thermally conductive support plate 622. Keyboard support plate 622 is typically made of aluminum. It is appreciated however, that any of a number of other substantially rigid, thermally conductive materials may be used. Integrated circuit device 602 is attached to a C4 package 604 that is housed within a processor module 610. The processor module includes one or more integrated circuit packages that are attached to a printed circuit board 611. A processor module lid 612 that serves to protect the integrated circuit package is attached to printed circuit board 611 by a plurality of fasteners 614. A thermal grease (not shown) is generally disposed between the backside of integrated circuit device 602 and module processor lid 612. A flat heat pipe 628 is thermally coupled to the bottom surface of the metal keyboard support plate 622. Heat pipe 628 may be attached to support plate 622 by any of a variety of attachment mechanisms such as, thermal adhesives, solder, thermal tape or other known thermal connection techniques, combinations thereof, and/or combinations with known mechanical fasteners such as bolts or the like. Module processor lid 612 is thermally coupled to the bottom surface of heat pipe 628. A thermal grease or other compliant thermally conductive material may be disposed between the bottom surface of heat pipe 628 and the top surface of lid 612 to enhance the heat transfer between the two components. Heat is transferred away from the backside surface of integrated circuit device 602 and into heat pipe 628 across lid 612. Heat pipe 628 distributes the heat generated by the integrated circuit device in a substantially uniform fashion along the backside surface of keyboard support plate 622. The heat is ultimately released from the keypad surface to the ambient environment by natural convection and radiation.

It is important to note that the heat removal system shown in FIG. 8 is illustrative of only one of many conceivable heat transfer systems that may be used in conjunction with the present invention. For example, integrated circuit device 602 may be housed within a tape carrier package that is directly attached to the backside of heat pipe 628. Alternatively, device 602 may be located remotely from flat heat pipe 628 and thermally coupled to the flat heat pipe 628 via a low resistant thermal path, such as a traditional round heat pipe.

Figure 9:
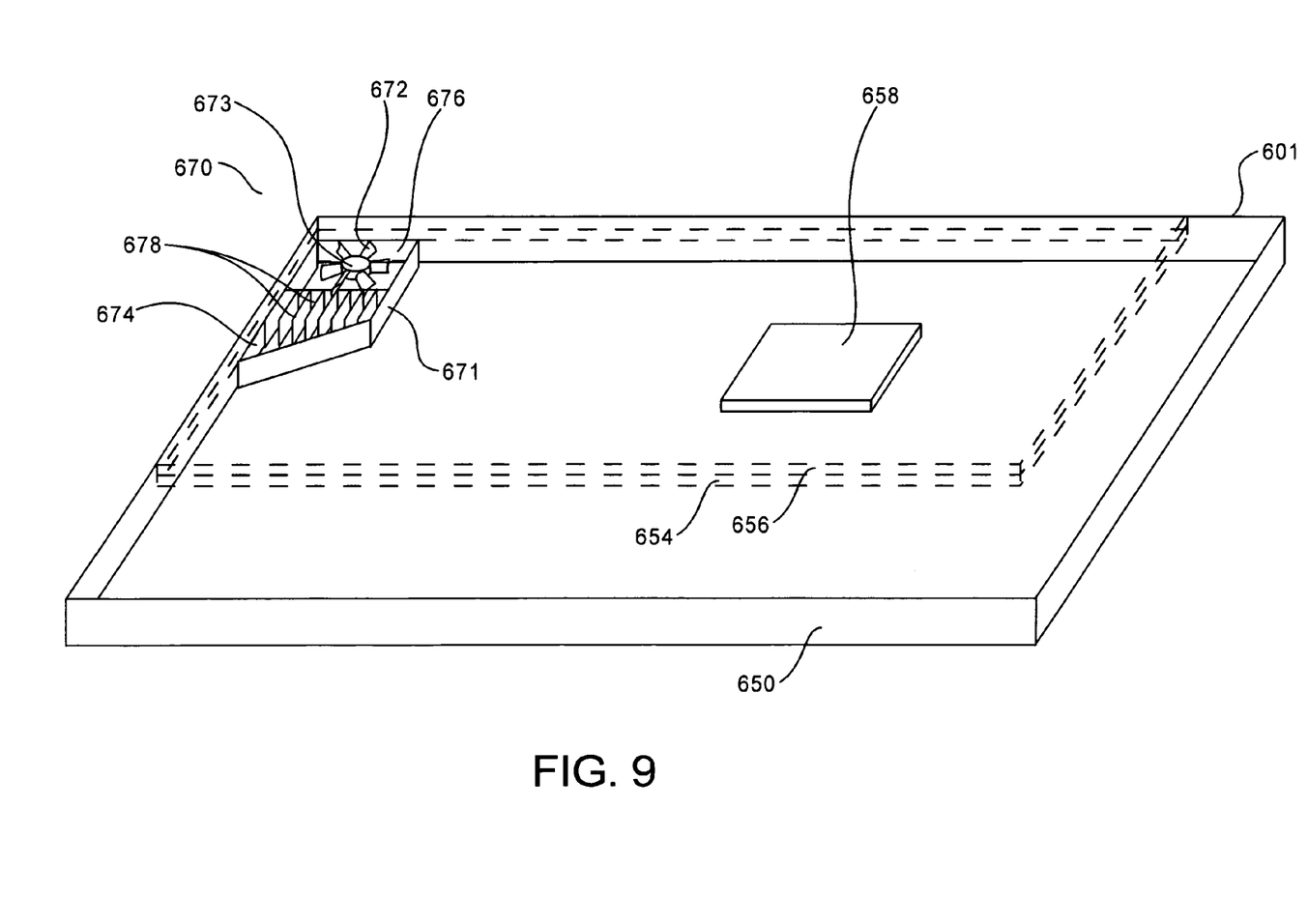
FIG. 9 illustrates a perspective view of a heat removal system in accordance with another embodiment of the present invention.

In the foregoing discussion a passive heat removal apparatus has been described wherein heat is removed from a heat generating device through a flat heat pipe that is attached to the bottom surface of a keyboard support plate. The heat is ultimately released from the keypad surface of the keyboard to the ambient environment by natural convection and radiation. In FIG. 9, an alternative embodiment is shown wherein a portion of the heat spreading flat heat pipe is attached to a fan housing. FIG. 9 illustrates a base housing 650 of a notebook computer. A display is usually attached the housing along the backside 601 of the base housing via a hinged connection.

As illustrated, the notebook computer includes a heat generating device 658 that is thermally coupled to the bottom surface of a flat heat pipe 654. The top surface of heat pipe 654 is, in turn, attached to the bottom surface of a computer keyboard support plate 656.

A fan assembly 670 is included within housing 650. Computer housing 650 includes an air inlet 674 located along a first side and an air outlet 676 on a second side (e.g., the back). Fan assembly 670 includes a horizontally mounted fan 672 that is driven by an electric motor 673. Air is drawn into fan housing 671 through air inlet 674. Fan housing 671 includes one or more fins 678 located within an air inlet channel. The fins may be attached to the fan housing or integrally formed therewith. A portion of heat pipe 654 is thermally coupled to fins 678. Heat pipe 654 may be attached directly to fins 678, or alternatively, may be attached to a fan assembly cover plate (not shown) that is thermally coupled to the fins. In one embodiment heat pipe 654 may form a portion of the fan assembly housing cover. As a result of attaching a portion of heat pipe 654 to the fan assembly, a portion of the heat generated by device 658 is dissipated through the flat heat pipe to the fan assembly fins 678. Air flow generated by fan 672 causes air to flow across fins 678. The heated air is then exhausted to the ambient through air outlet 676.

It is important to note that the present invention is not limited to a fan assembly having a set of fins for effecting heat transfer away from heat pipe 654. For example, heat pipe 654 may be attached to a portion of a fan housing that does not included fins. In such an embodiment, an air flow generated by a fan or other air moving means may be directed so as to impinge a portion of the fan assembly housing that is thermally coupled to heat pipe 654.

Since the effective thermal conductivity of heat pipe 654 is very large, heat generating device 658 can be coupled to heat pipe 654 at essentially any location. Heat generated by device 658 spreads substantially uniformly across the entire heat pipe. In accordance with the heat removal system of FIG. 9, a portion of the heat will be dissipated to the ambient through the keyboard via natural convection and radiation. Additionally, a portion of the heat will be removed through the fan assembly fins by means of forced convection heat transfer caused by the air flowing across the fins.

Figure 10:
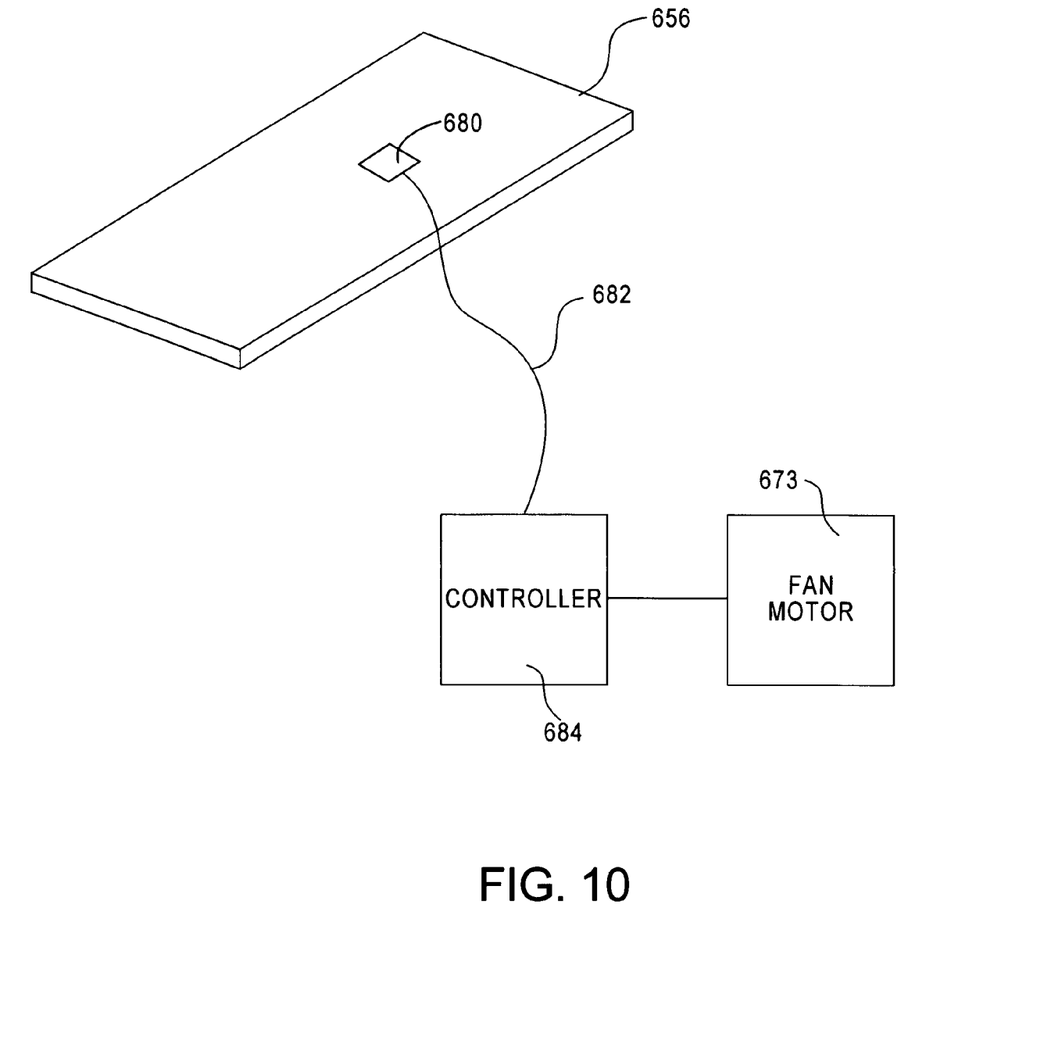
FIG. 10 illustrates a control circuit for a fan assembly in one embodiment of the present invention.

In one embodiment, a control circuit is provided for switching the electric motor 673 of fan assembly 670 on and off. As shown in FIG. 10, the control circuit includes a temperature sensing device 680, such as a thermistor, that is attached to the keyboard 656 at one or more locations. Alternatively, temperature sensing device 680 may be attached to heat generating device 658. Temperature sensing device 680 provides an input 682 to a controller 684, switch, or the like, that controls the delivery of electrical power to fan motor 673. Thus, in order to conserve battery power, fan assembly 670 is energized only during specific operations when additional heat removal capability is required.

Figure 11:
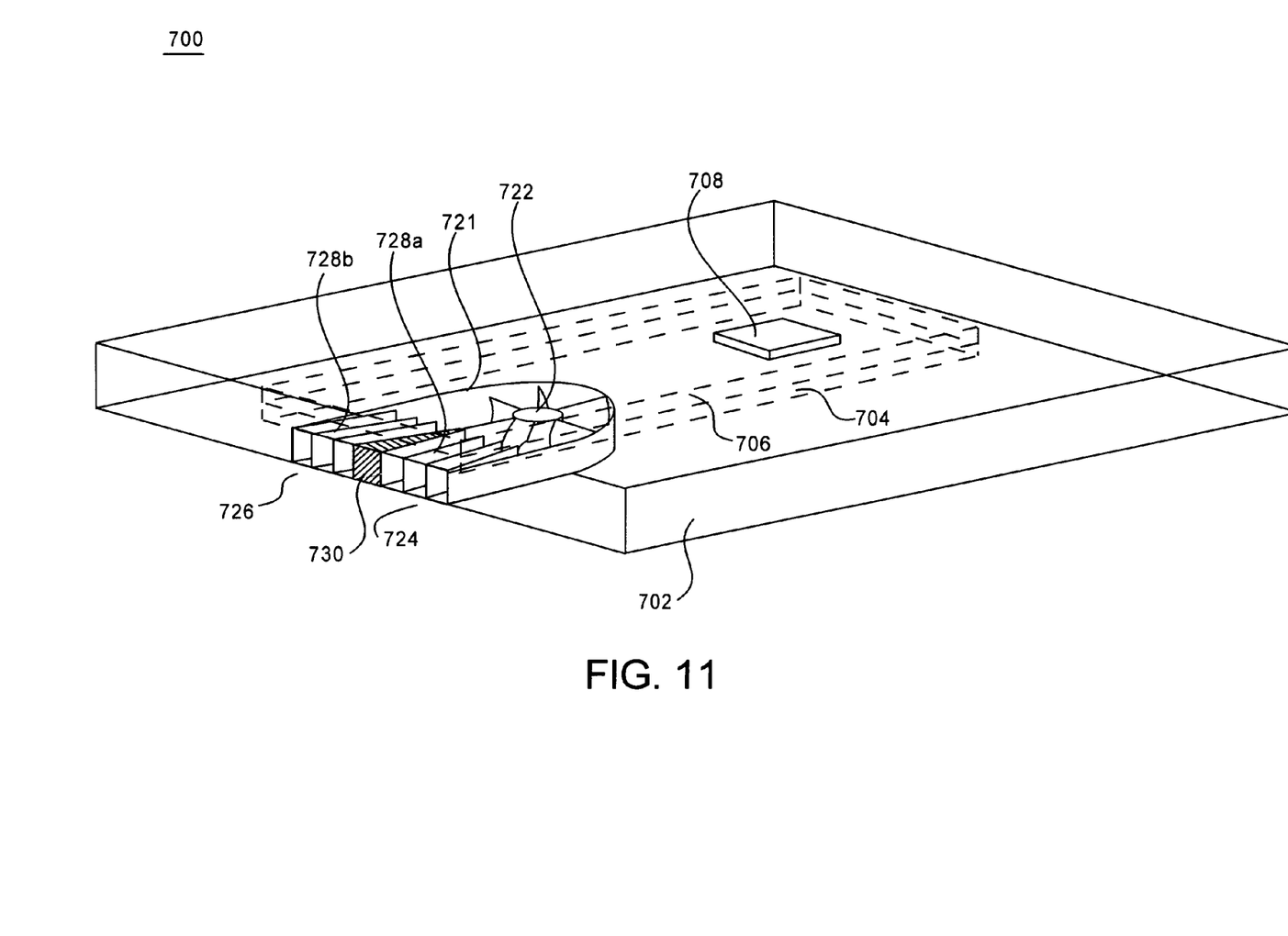
FIG. 11 illustrates a perspective view of a heat removal system in another embodiment of the present invention.

FIG. 11 illustrates another embodiment of the present invention wherein a portion of the flat heat pipe is thermally coupled to a fan housing. As shown, computer housing 702 includes a heat generating device 708 that is attached to the bottom side of a flat heat pipe 704. The top side of heat pipe 704 is attached to the backside of a keyboard support plate 706. A portion 705 of heat pipe 704 is thermally coupled to fins 728 located within a fan assembly housing 721. The heat removal system of FIG. 11 works in essentially the same manner as the system depicted in FIG. 9. The only difference between the two systems lies in the fan assembly configuration.

Figure 12A:
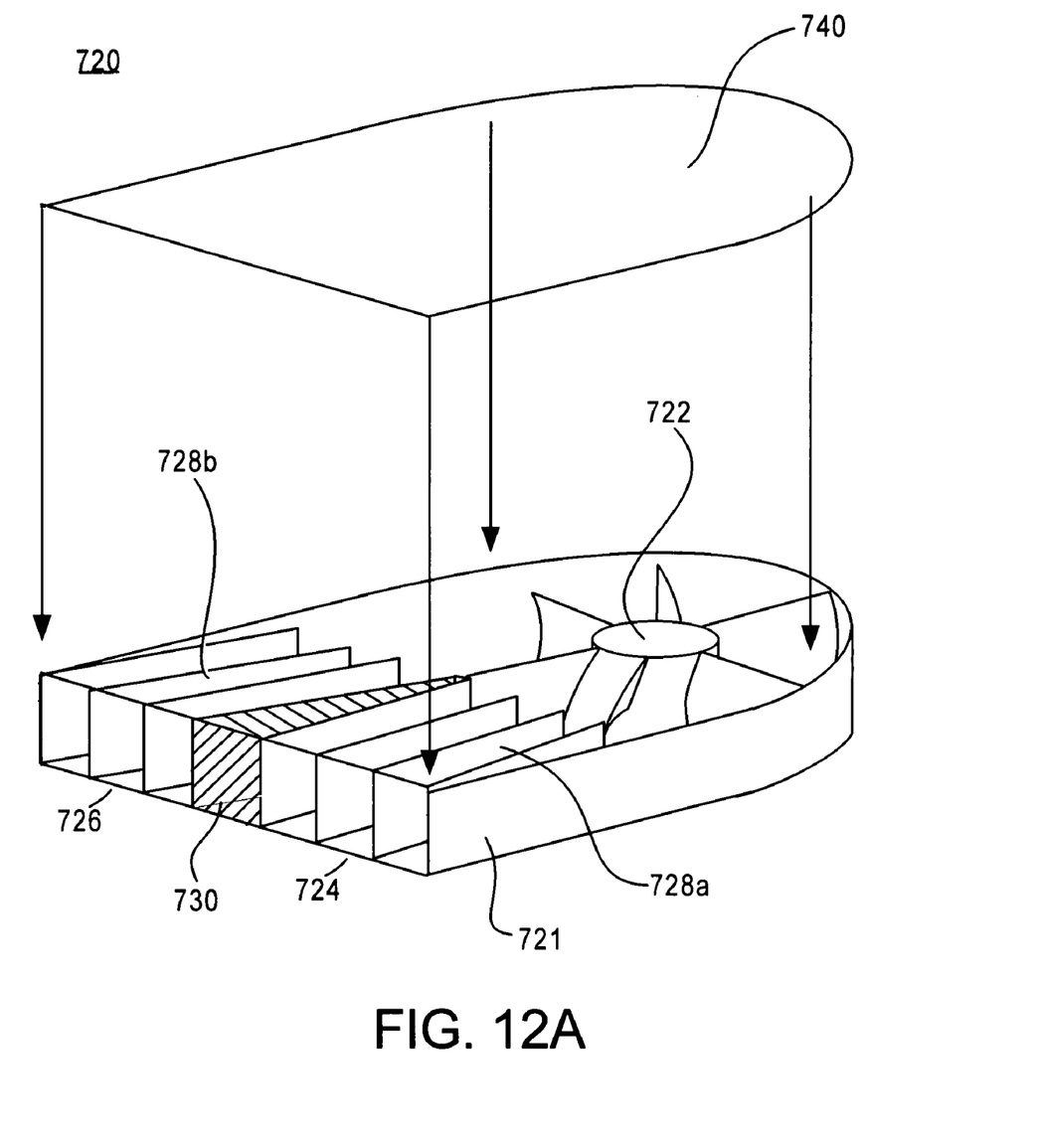
FIG. 12A illustrates a perspective view of the fan assembly illustrated in FIG. 11.
Figure 12B:
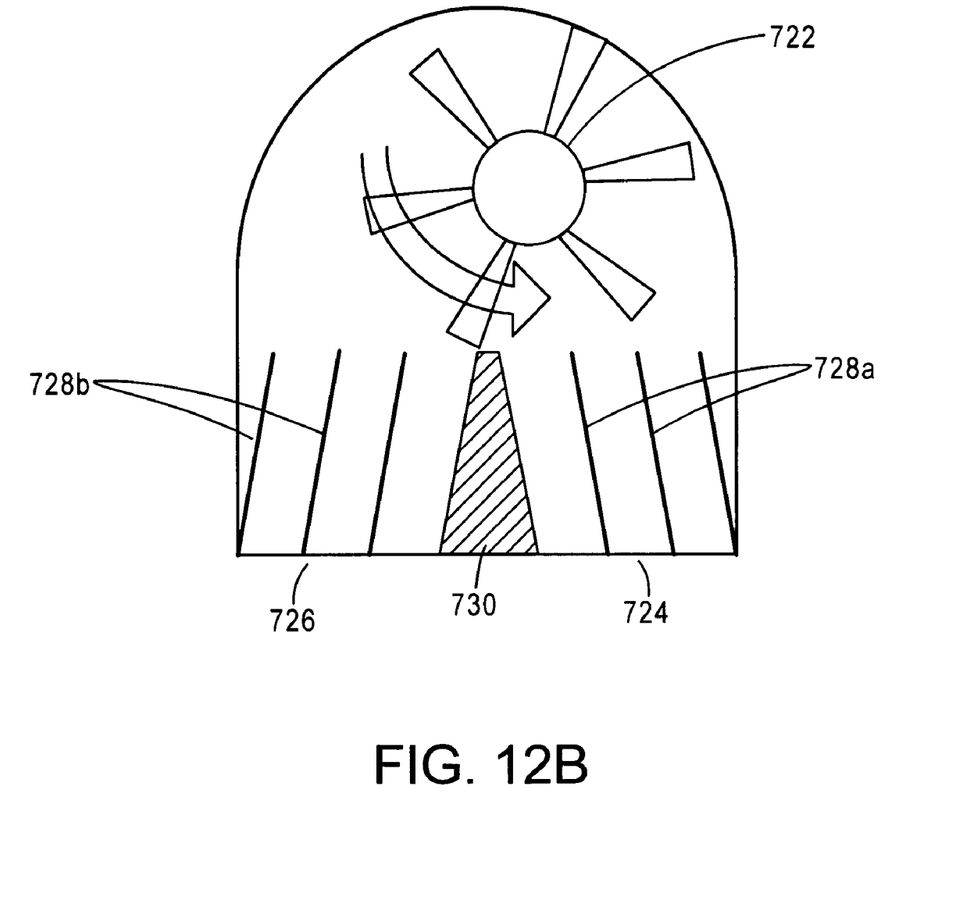
FIG. 12B illustrates a top view of the fan assembly illustrated in FIG. 12A.

Fan housing 721 of assembly 720 forms a U-shaped chamber having a closed end portion containing a fan 722 and an open end. An inlet 724 and an outlet 726 are placed at the open end of the housing 721 and are separated by a divider 730. A first set of fins 728a extends from the inlet 724 towards the fan 722, and a second set of fins 728b extends from the fan 722 towards the outlet 726. The air inlet and outlet configuration of fan housing 721 permits air to enter and exit the fan assembly along one side of the computer housing 702, thus permitting greater flexibility in the design and placement of the computer system components. FIGS. 12a and 12b illustrate a perspective view and a top view of fan assembly 720 in one embodiment of the present invention, respectively. In one embodiment, fan 722 is offset towards the inlet 724 relative to a longitudinal center line of the housing (i.e., in FIG. 12b, a line bisecting the U-shape from top to bottom). Viewed from the top (as shown in FIG. 12b), with the inlet 724 on the right, the fan 722 rotates in a counter-clockwise direction. In other embodiments, the fan may be centered, or the inlet and outlet may be switched and the fan rotation reversed. As shown in FIG. 12a, a fan assembly cover plate 740 may be thermally coupled to fins 728.

It is important to note that the embodiments of FIGS. 9 and 11 are not limited to any specific fan configuration. It is appreciated that any type of air moving means and air moving means housing configuration may be used that permits a portion of a flat heat pipe to be attached to the air moving means housing to effect heat transfer away from the heat pipe.

Thus, a heat removal system has been described that results in a cost efficient, low weight, extremely compact and thermally efficient thermal management system. Although the present invention has been described particularly with reference to FIGS. 3 through 12b, it is contemplated that many changes and modifications may be made by one of ordinary skill in the art without departing from the spirit and scope of the present invention.

What is claimed is:

1. An apparatus comprising:
   a keyboard having a thermally conductive support plate, said support plate having a substantially planar bottom surface;
   a flat heat pipe attached to said bottom surface of said keyboard support plate, a heat generating device thermally coupled to said flat heat pipe; and
   air moving means for producing an air flow through a housing, at least a portion of said housing being thermally coupled to said flat heat pipe, wherein said housing includes at least one fin disposed in the path of said air flow, said heat pipe thermally coupled to said fin.

2. The apparatus of claim 1, wherein said flat heat pipe comprises a plurality of micro-channels that are arranged parallel to one another.

3. The apparatus of claim 1, wherein said air moving means comprises a fan.

4. The apparatus of claim 3 further comprising a control circuit for switching said fan on or off in response to a temperature measurement on said keyboard.

5. The apparatus of claim 3 further comprising a control circuit for switching said fan on or off in response to a temperature measurement of said heat generating device.

6. The apparatus of claim 3 further comprising:
   a temperature sensing device attached to said keyboard; and
   a controller for receiving a signal from said temperature sensing device, said controller switching said fan on or off in response to said signal.

7. The apparatus of claim 3 further comprising:
   a temperature sensing device attached to said heat generating device; and
   a controller for receiving a signal from said temperature sensing device, said controller switching said fan on or off in response to said signal.

8. The apparatus of claim 1 wherein said flat heat pipe covers at least about one-half of the surface area of said bottom surface of said keyboard support plate.

9. The apparatus of claim 1 wherein said flat heat pipe covers substantially the entire surface area of said bottom surface of said keyboard support plate.

10. The apparatus of claim 1 wherein said flat heat pipe defines an open area sized to accommodate a component of said portable computer.

11. An apparatus comprising:
    a keyboard having a thermally conductive support plate, said support plate having a substantially planar bottom surface;
    a flat heat pipe attached to said bottom surface of said keyboard support plate, a heat generating device thermally coupled to said flat heat pipe; and
    a fan for producing air flow through a fan housing, said fan housing thermally coupled to said flat heat pipe, wherein said flat heat pipe has a first end and a second end, said heat generating device is thermally coupled to said flat heat pipe adjacent to said first end, and said fan housing is thermally coupled to said flat heat pipe adjacent said second end.

12. The apparatus of claim 11, wherein said flat heat pipe comprises a plurality of micro-channels that are arranged parallel to one another.

13. The apparatus of claim 11 further comprising a control circuit for switching said fan on or off in response to a temperature measurement on said keyboard.

14. The apparatus of claim 11 further comprising a control circuit for switching said fan on or off in response to a temperature measurement of said heat generating device.

15. The apparatus of claim 11 further comprising:
    a temperature sensing device attached to said keyboard; and
    a controller for receiving a signal from said temperature sensing device, said controller switching said fan on or off in response to said signal.

16. The apparatus of claim 11 further comprising:
    a temperature sensing device attached to said heat generating device; and
    a controller for receiving a signal from said temperature sensing device, said controller switching said fan on or off in response to said signal.

17. The apparatus of claim 11 wherein said flat heat pipe covers at least about one-half of the surface area of said bottom surface of said keyboard support plate.

18. The apparatus of claim 11 wherein said flat heat pipe covers substantially the entire surface area of said bottom surface of said keyboard support plate.

19. The apparatus of claim 11 wherein said flat heat pipe defines an open area sized to accommodate a component of said portable computer.

20. An apparatus comprising:

a keyboard having a thermally conductive support plate, said support plate having a substantially planar bottom surface;

a flat heat pipe attached to said bottom surface of said keyboard support plate, a heat generating device thermally coupled to said flat heat pipe; and a fan for producing air flow through a fan housing, said fan housing thermally coupled to said flat heat pipe, wherein said flat heat pipe includes two metal plates having respective first surfaces joined together and having respective second surfaces, at least one of said metal plates being formed such that a channel is formed between said first surfaces of said metal plates and a protrusion is formed on said second surface of said formed metal plate, said protrusion corresponding to said channel.

21. The apparatus of claim 20, wherein said flat heat pipe comprises a plurality of micro-channels that are arranged parallel to one another.

22. The apparatus of claim 20 further comprising a control circuit for switching said fan on or off in response to a temperature measurement on said keyboard.

23. The apparatus of claim 20 further comprising a control circuit for switching said fan on or off in response to a temperature measurement of said heat generating device.

24. The apparatus of claim 20 further comprising:

a temperature sensing device attached to said keyboard; and a controller for receiving a signal from said temperature sensing device, said controller switching said fan on or off in response to said signal.

25. The apparatus of claim 20 further comprising:

a temperature sensing device attached to said heat generating device; and a controller for receiving a signal from said temperature sensing device, said controller switching said fan on or off in response to said signal.

26. The apparatus of claim 20 wherein said flat heat pipe covers at least about one-half of the surface area of said bottom surface of said keyboard support plate.

27. The apparatus of claim 20 wherein said flat heat pipe covers substantially the entire surface area of said bottom surface of said keyboard support plate.

28. The apparatus of claim 20 wherein said flat heat pipe defines an open area sized to accommodate a component of said portable computer.

* * * * *